United States Patent [19]

Finet et al.

[11] 4,418,773

[45] Dec. 6, 1983

[54] CONVEYOR CALIBRATION TECHNIQUE

[75] Inventors: Alain Finet, Newbury; Louis R. Nerone, Cleveland; Michael J. Zenisek, Hiram, all of Ohio

[73] Assignee: Stock Equipment Company, Cleveland, Ohio

[21] Appl. No.: 217,241

[22] Filed: Dec. 17, 1980

[51] Int. Cl.³ .................... G01G 11/14; G01G 23/14; G01L 25/00; B67D 5/08
[52] U.S. Cl. .................................... 177/16; 177/165; 73/1 B; 222/55
[58] Field of Search .................. 177/16, 165; 73/1 B; 222/55

[56] References Cited

U.S. PATENT DOCUMENTS

| | | |
|---|---|---|
| 2,974,518 | 3/1961 | Jones ............................. 177/165 X |
| 3,187,944 | 6/1965 | Stock . |
| 3,610,908 | 10/1971 | Karosas ........................... 177/16 X |
| 3,960,225 | 6/1976 | Hyer et al. . |
| 3,976,150 | 8/1976 | Wilson et al. . |
| 4,071,102 | 1/1978 | Van Ostenbridge et al. ...... 177/165 |
| 4,134,465 | 1/1979 | Takahama et al. .................. 177/16 |
| 4,194,649 | 3/1980 | Bullivant et al. ............... 177/165 X |

*Primary Examiner*—George H. Miller, Jr.

*Attorney, Agent, or Firm*—Pearne, Gordon, Sessions, McCoy, Granger & Tilberry

[57] ABSTRACT

A method is disclosed for calibrating a bulk material weighing and metering conveyor of the endless belt type providing a variable frequency signal indicative of feed rate. In such a conveyor system, a belt speed signal and a tare-adjusted weight signal are multiplied to provide a product signal that is converted into a periodic pulse signal whose frequency indicates the feed rate (net weight per unit of time) of the material being metered by the conveyor. In a first calibration step, the weight of the empty conveyor belt is measured over one belt revolution by counting the periods of the feed rate indicative pulse signal. This count is then used to establish a tare weight reference value. With the tare weight reference value established and the feed rate signal compensated therefor, a second calibration step is performed wherein the periods of the feed rate indicative pulse signal are again counted for a known increment of belt travel with a known net weight of material for such increment of belt. This second count is compared to the theoretically expected count, such comparison being used to determine the accuracy of the indicated feed rate and to effect necessary calibration adjustments if needed.

6 Claims, 1 Drawing Figure

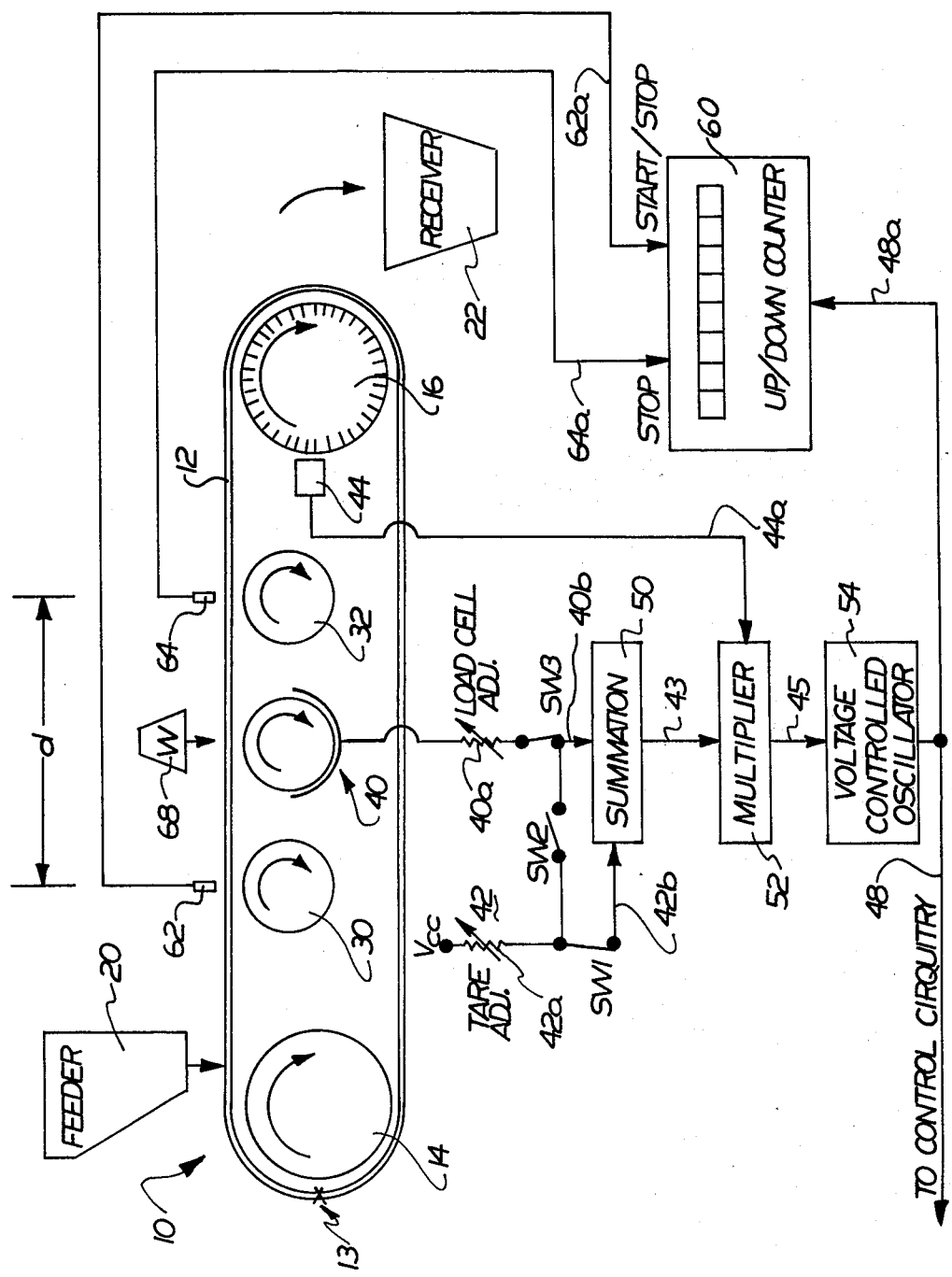

CONVEYOR CALIBRATION TECHNIQUE

BACKGROUND OF THE INVENTION

The present invention is directed in general to calibration techniques, and in particular to a method of calibrating a bulk material metering conveyor of the gravimetric or material weighing type that provides a continuous periodic pulse signal whose frequency is indicative of the feed rate (net weight per unit of time) of the material carried by the belt.

In such a conveyor, a piezoelectric type or strain gauge type load cell transducer supports a weighing roller having the conveyor belt riding on it to provide, for a known weighing span increment of belt length, a gross weight signal indicative of the weight of material on the belt plus the tare weight, i.e., the weight of the belt section (weighing span) supporting the material, the weight of the weighing roller, and the weight of other load cell-supported elements. The conveyor further includes a belt speed transducer such as a belt drive shaft encoder of the electronic odometer type providing a pulse for each increment of belt travel, the rate of such pulses constituting a belt speed signal (belt length increments per unit of time) that is multiplied by a tare-adjusted weight signal (net weight per belt length increment) to provide a product signal indicative of the feed rate (net weight per unit of time) of the material being metered by the conveyor. The product signal is then converted into a periodic pulse signal whose frequency is indicative of the conveyed material feed rate. For example, in the case of a metering conveyor used to feed coal to a fossil fuel power plant boiler or metal ore to a furnace, a feed rate signal frequency range of 100 Hertz to 10 Kilohertz could represent a feed rate range of minimal tons of material per hour to 100 tons of material per hour. Also, the feed rate signal can be integrated to indicate the total or cumulative amount of material delivered by the conveyor.

To ensure the accuracy of the feed rate signal and other values calculated from it, it is necessary from time to time to calibrate the tare weight compensation used to adjust the gross weight signal. It is also desirable to calibrate the gross weight signal from the load cell and the belt speed signal from the shaft encoder. In effecting such feed rate signal calibration, it is desirable to minimize the amount of calibration equipment needed, the amount of time it takes to calibrate the feed rate signal, and the complexity of the calibration procedure.

SUMMARY OF THE INVENTION

A bulk material weighing and metering conveyor of the endless belt type provides a belt speed signal and a tare-adjusted bulk material weight signal. The speed signal and the adjusted weight signal are multiplied together to provide a product signal that is converted into a periodic pulse signal whose frequency indicates the feed rate (net weight per unit of time) of the material being metered by the conveyor.

In accordance with the present invention, a method of tare weight calibration of the subject type of metering conveyor includes the step of counting the periods of the periodic pulse signal for at least one revolution of the empty conveyor belt without tare weight adjustment to weight signal. In another step, the weight signal is removed and a preselected tare compensation signal substituted in its place. In another step, the periods of the periodic pulse signal are counted for at least one revolution of the conveyor belt, with the tare compensation signal substituted in place of the weight signal without tare adjustment. The two counts are compared, the degree of difference between the counts indicating the accuracy of the tare compensation signal relative to actual tare weight of the empty conveyor belt and related tare weight elements. If needed, the tare compensation signal can be adjusted and the tare calibration method can be repeated until the difference between the counts is minimized, thus indicating that the tare compensation signal is a generally accurate representation of the tare weight of the empty conveyor belt and related tare weight elements. With the counts minimized, the tare weight signal is subtracted from the weight signal prior to its being multiplied with the belt speed signal.

In further accordance with the invention, a method of feed rate calibration includes the step of providing a continuous tare-adjusted weight signal indicative of a known value of weight on a selected weighing span of the endless belt of the conveyor. Another step includes revolving the endless belt for at least a predetermined increment of belt travel substantially less than the length of the belt. Another step includes counting the periods of the periodic pulse signal during the increment of belt travel. The count is compared to the theoretically expected count to determine the accuracy of the feed rate signal. To minimize the difference between the counts, only the weight signal need be adjusted. The feed rate calibration procedure is repeated for a plurality of the known belt length increments about the extent of the belt to average out the effect of different belt weights for different increments of its length.

BRIEF DESCRIPTION OF THE DRAWING

The drawing is a schematic view of a gravimetric type metering conveyor system incorporating calibration means effecting a calibration method in accordance with the present invention.

DETAILED DESCRIPTION OF THE PREFERRED EMBODIMENT

The drawing illustrates in schematic fashion a conveyor system 10 of the endless belt type for metering and weighing bulk material such as coal, metal ore, or the like. A typical conveyor system of this type includes an elongated conveyor belt 12 formed of reinforced rubber. The conveyor belt extends between and revolves around a pair of spaced, cylindrical rollers, including a freewheeling idler roller 14 and a conveyor belt drive roller 16. The drive roller 16 is rotatably driven by suitable means wherein material dropped on the conveyor belt at its idler roller end from, for example, a feeding bin 20 is conveyed toward the drive roller end of the conveyor belt, where it is deposited into a receiver bin 22. For example, the material fed by the belt 12 can be crushed coal or metal ore that is deposited into the receiver bin 22 in the form of a coal pulverizer or a metal ore furnace.

Such a conveyor system is known as a gravimetric system in that the material falls onto the conveyor belt and is transported over a material weighing span illustrated in the drawing as distance d. The weighing span is typically defined as the distance between a pair of weighing span support rollers including a first roller 30 and a second roller 32. These rollers rotatably idle and are driven by the belt 12 that rides over them. A weighing roller 40 is positioned generally at the midpoint between the span rollers 30, 32. The weighing roller 40, the belt 12 riding over it, and other belt-supporting elements are supported by, for example, a piezoelectric bridge element or a strain gauge element which constitutes a load cell for providing a gross weight signal generally in the form of an analog voltage. This gross weight signal is an indication of the weight of the material on the belt section of the weighing span d plus the tare weight, i.e., the extraneous weight signal portion provided by the weight of the weighing roller, the weight of the belt section between the rollers 30, 32 over the distance d, and the weight of other belt support elements that may bear on the load cell. The load cell-supported weighing roller 40 and the signal it provides is used with a belt speed signal provided by a belt speed odometer, such as an electronic shaft encoder transducer 44 to indicate the transfer rate or feed rate of the material being transferred from the feeder bin 20 to the receiver bin 22. The belt speed odometer, for example, can be of the optical type wherein equidistantly spaced marks etched on the rotating drive shaft of the drive roller 16 are detected to provide a pulse signal wherein each pulse indicates a small increment of belt travel.

The weight signal from the load cell-supported weight roller 40 is provided on a weight signal line 40b via a weight signal calibration resistor 40a to a summation means 50, such as a conventional electronic adder. A tare weight compensation source 42, including a tare weight compensation calibration resistor 42a, is provided via a compensation signal line 42b to the summation means 50. The signal indicative of tare weight is subtracted from the gross weight signal provided on line 40b, wherein a signal generally indicative of the net weight of the material on the roller 40 is provided on a tare-adjusted net weight signal line 43. The tare-adjusted net weight signal on line 43 and a belt speed signal from the transducer 44 provided on a belt speed signal line 44a are multiplied together by a multiplier 52 to provide, on a signal line 45, a product signal that is indicative of the feed rate of the material in terms of net weight per unit of time. This product signal is, for example, of the analog type and it is converted from an analog voltage to a frequency by means of, for example, a voltage control oscillator 54 whose output line 48 carries a feed rate signal whose frequency will vary as the product of the material weight and its speed of conveying changes. For example, for an increasing net weight of material on the belt and a proportionally decreasing speed of conveying, the frequency of the signal on line 40a will remain constant. Alternatively, an increase in material weight without a proportional decrease in belt speed will change the frequency of the feed rate to signal on line 48, thus indicating a change (increase) in feed rate. An example of a circuit suitable for accomplishing the above-noted functions of elements 50, 52, and 54 is disclosed in copending application Ser. No. 215,817, filed Dec. 12, 1980, assigned to the assignee of the present invention.

The present invention is directed to a simple and straightforward method of calibrating a type of metering conveyor system as described above. In practicing the method of the present invention, a conventional pulse counter 60, preferably of the UP/DOWN type and having a visual display 60a of the measured count, is provided. The count input to the UP/DOWN counter 60 is constituted by the variable frequency feed rate signal output of the voltage control oscillator 54 which is provided to the counter 60 via a feed rate signal calibration line 48a. The count is initiated or terminated by means of a first belt movement detector 62 having a pulse output provided to trigger the counter 60 via a first detect signal line 62a and a second belt movement detector 64 having a pulse output provided via a second detect signal line 64a to trigger the counter 60. In calibrating the subject conveyor system, a series of three calibration switches SW1, SW2, SW3, and a calibration weight 68 are also utilized.

The detectors 62, 64 are, for example, of the optical edge detector type wherein a piece of reflective tape is attached to the moving edge of the belt 12, at, for example, a location 13, such reflective tape leading edge being detected by either of detectors 62, 64, which provide a triggering pulse to the counter 60 to either stop or start it, depending upon the calibration step being undertaken. Copending application Ser. No. 210,772, filed Nov. 26, 1980, and assigned to the assignee of the present application, illustrates a suitable detector for practicing the method of the present invention.

In a first calibration step in accordance with the present invention, the tare weight compensation signal provided on line 42b is calibrated in the following manner. In normal operation, calibration switches SW1 and SW3 are closed, while switch SW2 is open. To initiate a tare weight calibration procedure, switch SW2 remains open, while switch SW1 is opened to disconnect from the summer 50 the tare compensation signal or line 42b. In this first calibration procedure, with a piece of reflective tape, for example at location 13 on the edge of the conveyor belt 12, edge detector 62 is used to start and stop the counter 60, wherein the counter 60 will count the periods (number of pules) of the feed rate signal provided to it by the calibration line 48a. The empty conveyor belt 12 is brought up to a predetermined speed. The counter 60 is then enabled for triggering, and at the next passing of the reflective tape at the location 13 past the optical detector 62, the counter begins counting (UP COUNT) the periods of the pulse signal provided to it via line 48a. Such counting continues until the location 13 again passes the detector 62, thus indicating one complete revolution of the belt 12. This count is indicative of the tare weight, i.e., the actual weight of the belt, which will vary from section to section of its length, the weight of the weighing roller 40 and other tare elements that may bear on the load cell providing the gross weight signal on line 40b to the summer 50.

In the next step of tare weight calibration, switch SW3 is opened and switch SW2 is closed, with switch SW1 being opened. A preselected tare weight reference signal is provided to line 40b in place of the gross weight signal. Again, with the conveyor belt brought up to a predetermined speed preferably generally identical to the speed in the earlier calibration step discussed above, the counter 60 is enabled and a count (DOWN COUNT) is taken of the feed rate signal via line 48a for a revolution of the conveyor belt. While separate UP COUNTS could be taken for each calibration step, it is preferable, for the initial calibration step (when the belt is being weighed), that the counter 60 count up. With the tare compensation signal provided in the second calibration step, the counter 60 preferably counts down. If at the end of the countdown, a count shown on display 60a is minimal (within predetermined tolerance), such a comparison indicates that the tare weight compensation signal is adequate to generally approximate the tare weight of the belt, weight roller, and the like. If the comparison does not indicate a desired minimal difference between the two counts, the calibration steps noted above are repeated for a different reference value, such value being provided by adjustment of the calibration resistor 42a. It is noted that for a constant belt speed, the frequency on line 48 will vary plus and minus, since the weight of the belt is not equal per increment of its length. This is experienced during the first calibration count noted above. In the second calibration count, for a constant belt speed, the frequency on line 48 will remain generally constant, since the voltage provided by the tare adjustment compensation line is generally constant. However, the ending count per belt revolution will be approximately equal, thus indicating acceptable tare weight compensation.

After the tare adjustment calibration steps noted above are completed, switch SW3 is closed, switch SW2 is opened, and switch SW1 is closed, wherein the tare compensation signal is subtracted from the incoming gross weight signal to provide the tare-adjusted net weight signal on line 43 to the multiplier 52.

In a second calibration procedure in accordance with the present invention, a known calibration weight 68 of, for example, 10 pounds is hung from or placed on the load cell-supported weight roller 40 to provide a gross weight signal on line 40b of a known value. In this calibration step, the other optical detector 64 is used in conjunction with the detector 62 to start and then stop the counter 60. In this procedure, the periods (number of pulses) of the pulse signal provided to the counter on calibration line 48a are counted for the period of time that it takes the marked location 13 to pass between the detectors 62, 64. The detectors 62, 64 are precisely spaced apart from each other a known distance (e.g., distance d) preferably substantially less than the length of the belt), wherein the count shown by the counter 60 can be compared to the theoretically expected count for the known weight 68 and the known belt travel distance between detectors 62 and 64 (distance d). If the difference between the measured count on the counter 60 and the theoretically expected count are minimal, then such a circumstance indicates that the frequency on the feed rate signal line 48 accurately represents the net weight per unit of time feed rate of the material conveyed. If the difference between the measured count and the theoretically expected count is not minimal (within tolerance), adjustment is made to the weight signal, using the load cell adjustment resistor 40a and the calibration steps noted immediately above are repeated.

It can be seen that such a calibration procedure advantageously only requires one adjustment, which in effect can calibrate for an error in either the load cell-supported roller output signal or the belt speed odometer output signal on line 44a, since it is the product of the two that determines the frequency on line 48. It is also noted that the calibration of the feed rate signal is preferably performed by placing a plurality of belt markers, i.e., reflective tape, on the edge of the belt, such markers being spaced away from each other at least a distance slightly greater than the distance d. Thus, a plurality of belt increments of distance d length can be averaged to effect an overall accuracy of calibration of the feed rate signal.

The calibration procedure in accordance with the invention as noted above advantageously allows accurate calibration of the feed rate by means of only one adjustment to compensate for errors in both the load cell output and the belt travel odometer. Further, the count comparison is an indication of how accurate the calibration is. Further, the method of the present invention allows a tare calibration based on the actual weight of the complete length of the feed belt and related tare weight elements. Also, only one adjustment is required to calibrate the feeder tare weight.

While the invention has been shown and described with respect to a specific embodiment thereof, this is intended for the purpose of illustration rather than limitation, and other modifications and variations will be apparent to those skilled in the art all within the intended scope and spirit of the invention. Accordingly, this patent is not to be limited to the specific embodiment herein shown and described, nor in any other way which is inconsistent with the extent to which the progress in the art has been advanced by this invention.

What is claimed is:

1. For a bulk material weighing and metering conveyor of the endless belt type providing a belt speed pulse signal and a tare-adjusted bulk material weight analog signal, the speed signal and the adjusted weight signal being multiplied to provide a product signal that is converted into a periodic pulse signal of constant amplitude whose frequency indicates the feed rate (net weight per unit of time) of the material being metered by the conveyor, a method of tare weight calibration comprising the steps of:

counting the periods of the periodic pulse signal for at least one revolution of the empty conveyor belt without tare weight adjustment to the weight signal;

removing the weight signal and substituting in its place a preselected tare compensation signal;

counting the periods of the periodic pulse signal for at least one revolution of the conveyor belt with the tare compensation signal substituted in place of the weight signal without tare adjustment; and comparing the counts to determine the difference between them, the degree of difference between the counts indicating the accuracy of the tare compensation signal relative to the actual tare weight of the empty conveyor belt and related tare weight elements.

2. A method according to claim 1, including adjusting the preselected tare compensation signal and repeating said counting, said removing and substituting, said counting, and said comparing until said degree of difference is minimized to a desired value.

3. A method according to claim 1 or 2, including the final steps of replacing the weight signal in place of the tare compensation signal and utilizing the tare compensation signal to effect tare weight adjustment to the weighing signal prior to its multiplication with the belt speed signal.

4. For a bulk material weighing and metering conveyor of the endless belt type providing a belt speed pulse signal and a tare-adjusted bulk material weight analog signal, the speed signal and the adjusted weight signal being multiplied to provide a product signal that is converted into a periodic pulse signal of constant amplitude whose frequency indicates the feed rate (net weight per unit of time) of the material being metered by the conveyor, a method of feed rate calibration comprising the steps of:

providing a continuous tare-adjusted weight signal indicative of a known value of net weight on a selected weighing span of the endless belt of said conveyor;

revolving the endless belt for at least a predetermined increment of belt travel substantially less than the length of said belt;

counting the periods of the periodic pulse signal during said increment of belt travel; and comparing said count to the theoretically expected count for such predetermined increment of belt travel and such known value of net weight, said comparing being indicative of the accuracy of said feed rate signal.

5. A method according to claim 1, including repeating said providing, revolving, counting, and comparing for a plurality of said at least one predetermined increment of belt travel to determine the accuracy of said feed rate signal for each of said plurality.

6. A method according to claim 1 or 2, including adjusting only said weight signal to minimize the difference between said count and said theoretically expected count.

* * * * *